Sept. 13, 1966  G. W. LESCHER  3,272,506

PATTERN FOR GENERATING THE SUBJECTIVE EFFECT OF COLOR

Filed Nov. 22, 1963  2 Sheets-Sheet 1

INVENTOR.
George Wright Lescher

INVENTOR.
George Wright Lescher

United States Patent Office 3,272,506
Patented Sept. 13, 1966

3,272,506
PATTERN FOR GENERATING THE SUBJECTIVE EFFECT OF COLOR
George Wright Lescher, 303 Hillwood Drive, Nashville, Tenn.
Filed Nov. 22, 1963, Ser. No. 325,712
16 Claims. (Cl. 272—8)

This invention relates to toys, entertainment devices, and advertising devices, and in particular to a functional pattern, the disposition of elements of which optically operate to produce the ocular and subjective effect of chromatic color to the viewer when the pattern is in a continuously repetitive particular type of motion, even though the pattern may present to the viewer only achromatic colors such as black and white when the pattern is not in motion. The pattern may be either removably or fixedly disposed upon, or a part of, any suitable device for imparting and sustaining the particular types of motion.

A primary object of the invention is to provide means for new, novel, and unusual color and configurational effects for use in connection with, but not limited to, toy spinning tops, toy rotating devices, entertainment or amusement devices, advertising purposes and devices, and the like, in which the unique, perplexing, and intriguing feature resides in the apparent emanation of chromatic colors from a moving pattern of only achromatic colors such as black and white, together with peculiarly characteristic shimmering, coruscating, display of rich, blending, non-demarcated, rainbow-like spectral colors in some instances not greatly unlike the effect seen at times in the Aurora Borealis, the character of such display being uniquely different from and improved in widespread brilliance over that otherwise obtainable from, or obvious in, the present state of the art.

A further object is to provide such an article which is readily adaptable to being manufactured if desired at extremely low cost in simple yet highly effective forms.

Nowhere in the literature or prior art or practice have I been able to find any reference to or anticipation of any prior discovery, knowledge, development, or application of the particular phenomenon upon which my invention is based. This phenomenon, however, in primary cause is undoubtedly associated with, and effects a substantially enhanced manifestation and a distinctly new variation of, the so-called "Fechner colors" which may be subjectively produced by intermittently contrasting achromatic stimuli. Such type colors were described by G. T. Fechner in 1838 in the course of his investigations of after-images (U.S. edition of Helmholtz, "Physiological Optics," vol. II, published by the Optical Society of America, 1924, pages 255–257); and the rotating black-and-white color disc devised by G. E. Benham in 1894 most effectively and strikingly demonstrated the Fechner colors (Luckiesh, "Color and Its Application," textbook published by Van Nostrand Co., New York, New York, 1915, pages 39–41; Committee on Colorimetry, "The Science of Color," textbook published by Crowell Co., New York, New York, 1953, page 109; and World Book Encyclopedia, vol. 3, published by Field Enterprises, Inc., Chicago, Illinois, 1953, page 1590a).

Color discs composed of angularly alternating plain black sectors and plain white sectors, such as were used in early investigations, produce more or less formless areas of distinguishable but relatively faint Fechner colors, the hues of which are somewhat changeable with changes in rate of rotation; that is, with the frequency of black-white sector cycles, or cycle units, per second.

To such discs, Benham added black or dark-shaded concentric circular arcs within the white or light-shaded sector, and in so doing succeeded in considerably emphasizing the Fechner colors in concentration and effectiveness. These added arcs, fundamental in the Benham discs, determine the colors and configurational characteristic of the displays of these rotating Benham discs. In this specification and the claims, the phrase "configurational element" will be used to denote a fundamental dark-shaded moving element which is contained within the confines of a light-shaded element and which, together with the relative geometric disposition of the leading and trailing edges of the light-shaded element, determines the dominant color effect and configurational characteristic of the resultant color display.

For good results the Benham arcs must be relatively narrow, and each must have white or light-shaded background immediately adjacent. As a Benham arc is widened its color effectiveness rapidly diminishes, and in continued widening assumes essentially the effect produced by the plain black sectors and white sectors.

The typical characteristic of the configurational display of the Benham disc is one or more circular rings of color, each ring consisting of one color of one hue, and each of the rings being separated from the next adjacent ones by distinct and prominent circular lines of demarcation; in other words the display consists of one or more individual circular rings of individual colors, each distinctly separated from, and not blendable into or mergeable with, the others. Changes in numbers, relative locations, adjacency, lengths, or widths of these arcs do not remove this typical configurational characteristic which is the function of and is determined by the Benham arcs.

The present invention, not limited in scope to the use of disc forms exclusively, provides and adds to a plain light-shaded element a different type of moving configurational element from that used by Benham and others, in consequence of which a new phenomenon, unexpected and not logical in the light of prior and present art and practice, becomes manifest in which a lively configurational display of brilliant, blending, merging, non-demarcated, rainbow-like colors are produced without the requirement of white or light-shaded background appearing within the confines of or, if more than one, between the configurational elements. The differences in configurational effect and the distribution and brilliance of colors between those produced by the Benham discs and the present invention are, upon being observed immediately obvious and very pronounced.

In describing this invention, and in particular the pattern and configurational element which are disclosed, reference is had to the accompanying drawings in which like characters designate corresponding parts in all views.

In the drawings:

FIGURE 1 is a plan view of a flat circular disc of black and white, showing a typical representation of the Benham disc prior art. In this figure, as in all other figures in the drawings, the type of cross-hatching shown is intended to indicate a dark-shaded color, either achromatic or chromatic, but preferably black. This symbol is used since there is no standard available for such a situation, and since the use of the standard black symbol would denote the achromatic color black exclusively, and since the use of no symbol at all would lend confusion and lack of clarity of meaning in the figures illustrating this particular invention. The use of white within a figure denotes a light-shaded color, either achromatic or chromatic, but preferably white.

Figure 1:
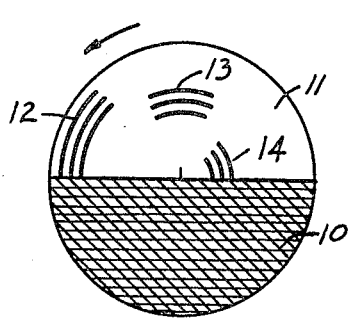

With reference to FIGURE 1, which shows the prior art Benham disc as typically represented and which has hereinbefore been described, one cycle unit comprising a dark-shaded sector 10, a light-shaded sector 11, and a series of dark-shaded circular arcs 12, 13, 14 concentric about the axis of rotation, is shown for the purpose of reference. With anti-clockwise rotation of the disc as indicated, outer arcs 12 appear as red, central arcs 13 as green, and inner arcs 14 as blue; with clockwise rotation, the effect is reversed, with outer arcs 12 becoming blue, central arcs 13 green, and inner arcs 14 red; and distinct lines of demarcation appear between the various arcs.

Figure 2:
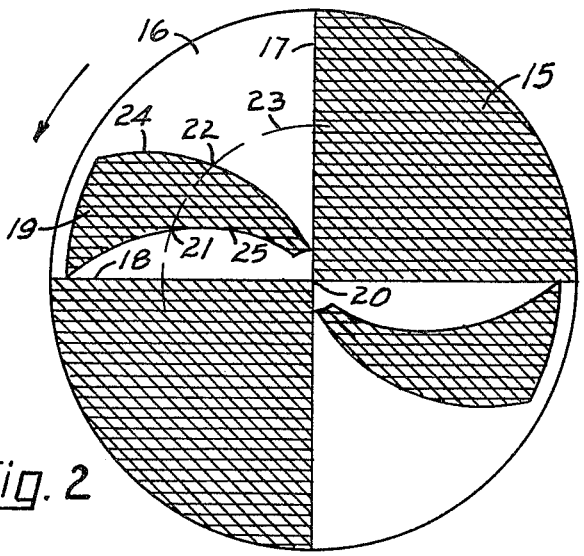
FIGURE 2 is a plan view of a rotary-type circular-pattern representation of the present invention, for the purpose of illustration of the basic geometric characteristic and principle of construction of patterns under the present invention.

FIGURE 2 is presented primarily to illustrate the geometric characteristic and principle of construction of patterns under the present invention. For the purpose of clarity and uniformity of understanding throughout this specification and the claims, the following phrases are here defined:

Pattern, or movable pattern: the total pattern device, whether consisting of one or a plurality of physically individual parts, which contains or carries the pattern area, but excluding supporting or driving units or parts thereof.

Pattern area: the illuminable and viewable area of the pattern traversed by the cycle unit during the prescribed motion thereof.

Cycle unit: the basic unit of, or in or on, the pattern, and containing the three color generating elements comprising a dark-shaded first segment, a light-shaded second segment, and a dark-shaded configurational element disposed within the light-shaded second segment.

Dark-shaded: of a dark hue of any chromatic or achromatic color, but preferably jet black. Note the cross-hatching symbol used in the drawings to denote dark-shaded color; see the description of FIGURE 1 in the foregoing description of the views of the drawings.

Light-shaded: of a contrasting light or pale hue of any chromatic or achromatic color, but preferably snow white. The use of white within a figure of the drawings denotes a light-shaded color, preferably white.

Configurational element: defined hereinbefore.

Non-demarcated: devoid of distinct lines of demarcation within or between colors and shades of colors within a spectrum range; that is, within a particular area having a plurality of merging or blending color hues or shades.

In FIGURE 2, an illuminable and viewable pattern area having two cycle units is shown, one in the upper half, the other in the lower half. Patterns containing more cycle units may be operated of course at a lower rate of motion, not cycle unit frequency, than those containing fewer cycle units, for essentially the same resultant color effect. Usually the best color effects are obtained at cycle unit frequencies of over about 3 cycle units per second, or, depending upon the particular shape and size of the pattern area, at or somewhat more than the speed at which the eye is capable of following individual elements of the cycle unit. The cycle unit of FIGURE 2 comprises a dark-shaded first segment 15, light-shaded second segment 16 having a trailing edge 17 and a leading edge 18, and dark-shaded configurational element 19 having a trailing edge 24 and a leading edge 25, said configurational element 19 lying within said light-shaded segment 16.

When this pattern is rotated anti-clockwise about axis of rotation 20 as indicated by the directional arrow at a rate of about 8 to 12 cycles per second, this configurational element produces over the face of the pattern area an effect of non-demarcated gradually blending colors from reddish toward the outer limit to bluish toward the inner limit of the configurational element, with other spectrum shades in between, including a wide dominant area of prominent green. With reversal of rotation, the reddish area becomes bluish and the bluish area reddish.

In all cases in all FIGURES 2 through 17, portion of the configurational element immediately trailing a dark-shaded segment in motion appears reddish, and when immediately leading a dark-shaded segment it appears bluish. Intermediate spectrum color shades appear at portions of the configurational element which do not immediately trail or lead a dark-shaded segment, with green most dominant in the vicinity of the central position between the trailing and leading.

Since the color effects generated are of a subjective nature, that is, being real insofar as ocular stimuli and mental perception are concerned, the apparent colors and vividness of the display as seen by different observers at different times may vary, dependent apparently on the physiological condition of the observer at the particular time. Generally, however, given a few moments for the eyes to become accommodated if such adjustment is not immediate, the foregoing colors begin to grow in prominence and brightness.

Usually the best results are obtained when the pattern area is brightly illuminated by artificial light, preferably incandescent such as when placed more or less directly under a shaded table or desk lamp having an incandescent bulb. Results with fluorescent light and indirect sunlight vary from good to mediocre.

Continuing with FIGURE 2, any point lying within any element of the cycle unit is referred to hereinafter as a constituent point of the cycle unit, and the path of such a constituent point while in motion is designated as the line of motion of such constituent point; thus, to illustrate as applicable in FIGURE 2, imaginary line 23 is a portion of the line of motion of constituent point 22 (and also, in this case, of point 21), and the line of motion in this case of a rotary-type circular pattern is a circle having as its center the axis of rotation 20 of the pattern. A direction normal to or at right angles to a line of motion of and at a constituent point is referred to hereinafter as being transverse to such line of motion; and the expression longitudinally of a line of motion means along or parallel to such line of motion of and at a constituent point.

Thus, again in the case of FIGURE 2, dark-shaded first segment 15, light-shaded second segment 16, and dark-shaded configurational element 19 extend transversely of a multiplicity of lines of motion. It has been determined experimentally that acceptable color effects may be produced when the dark-shaded first segment extends longitudinally of the lines of motion in distance from about 30% to about 55% (best at about 43.8%) of the lineal dimensions of the total cycle unit measured along the respective lines of motion, and the light-shaded second segment extends over the remaining 70% to 45% (best at about 56.2%) of the linear dimension of the total cycle unit, with the dark-shaded configurational element extending likewise longitudinally of the lines of motion in distance from about 15% to about 35% (best at about 18.7%) of the lineal dimension of the total cycle unit measured along the respective lines of motion.

In order to define the required attitude and unusual shape of the dark-shaded configurational element of the present invention, resort is being had here and hereinafter to the use of a multiplicity of imaginary constituent lines covering the entire area of the configurational element, such constituent lines extending longitudinally of those portions of the respective lines of motion of the respective constituent points lying within the said configurational element, such constituent lines being non-finite in width but being conjoined side by side along their lengths, and extending in length from the leading edge to the trailing edge of the configurational element at their respective locations.

Thus, in FIGURE 2, a typical constituent line lies between constituent point 22 on the trailing edge 24 of dark-shaded configurational element 19 and constituent point 21 on the leading edge 25 of configurational element 19, and lies longitudinally of (and on) line of motion 23 of constituent point 22 (and constituent point 21). The various conjoined constituent lines terminate in conjoined ends, and such conjoined ends by definition lie on and determine the leading edge 25 and trailing edge 24 of the dark-shaded configurational element 19, and therefore by their respective lengths and relative geometric dispositions determine the attitudes of component portions of the leading and trailing edges of the configurational element relative to the line of motion 23 at respective intersections therewith (at constituent points 21 and 22 in the illustration).

It will be seen accordingly, in FIGURE 2, that the component portion of leading edge 25 at constituent point 21 and the component portion of trailing edge 24 at constituent point 22, of configurational element 19, are disposed obliquely to, at their respective intersections 21 and 22 with, line of motion 23.

It will also be seen in FIGURE 2 that component portion of leading edge 18 and component portion of trailing edge 17, of light-shaded second segment 16, are disposed not obliquely, but at right angles, to and at their respective intersections with line of motion 23. However, leading edge 18 and trailing edge 17 may of course be so arranged that portions thereof will intersect the respective lines of motion also obliquely to such lines of motion.

Figure 4:
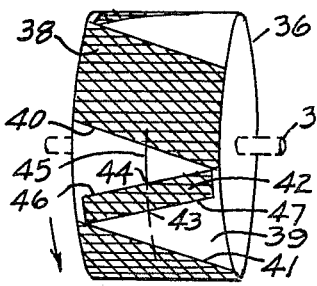
FIGURE 4 is a perspective view of a first embodiment of the invention in which an essentially strip-type pattern is applied to a cylindrical rotating drum.
Figure 5:
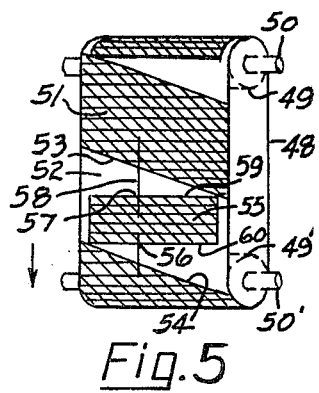
FIGURE 5 is a perspective view of a second embodiment of the invention in which an endless strip-type pattern moves translationally as an endless belt about two rotating drums.

The basic principle and requirement of the present invention and discovery permitting non-demarcated spectrum-type color displays lies in the angular relationship or geometric attitudes between the leading and trailing edges of the dark-shaded configurational element and those of the light-shaded second segment, and the respective lines of motion, in that (1) the leading edge and the trailing edge of the dark-shaded configurational element, or (2) the leading edge and the trailing edge of the light-shaded second segment, or (3) the leading edges and the trailing edges of both the dark-shaded configurational element and the light-shaded second segment must be disposed obliquely to, at their respective intersections with, the lines of motion of constituent points at their respective intersections. FIGURE 2 illustrates the first relative arrangement wherein the leading and trailing edges of only the configuration element are oblique to the lines of motion. FIGURES 5 and 4 depict the other two arrangements respectively.

Figure 3:
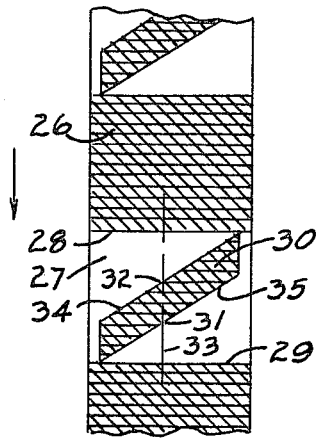
FIGURE 3 is a portion of a translational-type strip-pattern representation of the present invention to illustrate the corresponding characteristic and construction principle when applied to a pattern intended for translational motion rather than rotational.

Proceeding to FIGURE 3, a portion of a strip-type rather than a rotary-type pattern, wherein the motion of the cycle unit is translational rather than rotational, is shown for clarity of understanding of the relationships of the corresponding functional components shown in the rotary pattern. The same quality and characteristics of color displays are produced by the strip-type pattern although of course the general display configuration is linear rather than circular. The cycle unit shown in FIGURE 3 is comprised of dark-shaded first segment 26, light-shaded second segment 27, and dark-shaded configurational element 30 disposed within the confines of light shaded second segment 27. With the direction of motion of the cycle unit downward as shown by the arrow, the left side of configurational element 30 appears as reddish, the central area green, and the right side as bluish; and upon reversal of direction the reddish becomes bluish and the bluish becomes reddish.

Line of motion 33 is a straight line rather than circular. The components function optically and subjectively the same as in the rotary-type pattern as long as the basic requirement of obliqueness of leading and trailing edges relative to lines of motion, as specified above, is maintained. In the illustration of FIGURE 3, that component portion of leading edge 35 located at point 31 and that component portion of trailing edge 34 located at point 32, all in configurational element 30, are disposed obliquely to line of motion 33 at their intersections therewith at points 31 and 32, respectively. Leading edge 29 and trailing edge 28, of light-shaded second segment 27, do not intersect line of motion 33 obliquely in this first relative arrangement.

It will be readily understood from the preceding explanations that the principle of the invention so-disclosed in the foregoing may be readily applied to various embodiments thereof.

In FIGURE 4, which shows a first embodiment of the invention, an endless, essentially strip-type, rotating pattern is disposed around the outer surface of a cylindrical drum 36 which is supported by and rotated about a centrally-located spindle 37 projecting outwardly of one or both ends of drum 36. A plurality of complete cycle units is disposed around the outer surface of the pattern as indicated, one of such cycle units comprising dark-shaded first segment 38, light-shaded second segment 39, and dark-shaded configurational element 42. In this illustration, leading edge 47 at point 43 and trailing edge 46 at point 44, both of configurational element 42, are disposed obliquely to line of motion 45 at their respective intersections therewith at points 43 and 44 respectively; and also, in this instance as shown, leading edge 41 and trailing edge 40 of light-shaded second segment 39 intersect line of motion 45 obliquely at their respective intersections therewith, thus being illustrative of the third relative arrangement.

In all cases of FIGURES 4 through 17, a pattern may be made of any suitable material, such as metal, plastic, wood, cardboard, or paper, and unless otherwise designated it may be made adaptable for being removably, adjustably, or permanently applied to any separate suitable carrier which provides the necessary support and type and rate of motion required, and it may be an integral part of such carrier. The necessary component dark-shaded and light-shaded elements of the pattern may be painted, lithographed, embossed, printed, silk-screened, hot-stamped, or otherwise suitably provided or arranged to provide the required sequence of essential contrasting ocular stimuli.

FIGURE 5 shows a second embodiment of the invention, wherein the essentially strip-type pattern is, or is on, an endless belt 48 supported and moved by two rotating drums 49 and 49' supported by two centrally disposed shafts 50 and 50'. The motion of the cycle units is translational between the drums. The cycle unit, of which in the illustration a plurality is indicated, comprises dark-shaded first segment 51, light-shaded second segment 52, and dark-shaded configurational segment 55. In this figure is illustrated the case wherein only the leading edge 54 and the trailing edge 53, both of the light-shaded second segment, are disposed obliquely to line of motion 58 at their respective intersections therewith; leading edge 60 and trailing edge 59, of the dark-shaded configurational element 55, are not disposed obliquely to line of motion 58 at their respective intersections therewith at points 56 and 57 respectively, thus illustrating the second relative arrangement.

Figure 6:
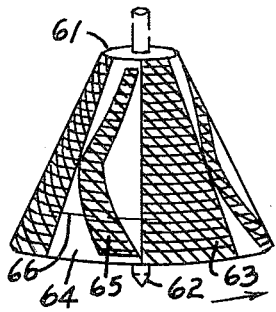
FIGURE 6 is a perspective view of a third embodiment in which an essentially rotary-type pattern is applied to a generally conical shaped surface rotating as a top.

FIGURE 6 is illustrative of a third embodiment of the invention in which an essentially rotary-type pattern is applied to at least a portion of a generally conical shaped surface 61 which rotates as in a spinning top having a vertical centrally-disposed spindle 62 upon and about which the device rotates. The figure indicates a plurality of complete cycle units on the pattern, a cycle unit comprising dark-shaded first segment 63, light-shaded second segment 64, and dark-shaded configurational element 65 within light-shaded second segment 64. Typical line of motion 66 is circular and concentric about the axis of rotation, and the leading and trailing edges of configurational element 65 are shown as being oblique to line of motion 66 at the respective intersections therewith. As indicated above, only a portion of a conical shaped surface may be used; the conical shaped surface may also be inverted and the pattern applied to the inner surface thereof.

A variation of character of the configurational element is shown in this figure, in that configurational element 65 is made up of two configurational elements of the same type as that hereinbefore illustrated but which are conjoined at the trailing edge of light-shaded second segment 64. The resultant configuration of the color display, while having the same basic non-demarcated spectrum character produced in all displays by the present invention, will show red near the lower edge of the pattern area, red near the upper edge, and blue in the central region of the conjoined configurational elements, with green and other spectrum sequences appearing in the regions between the reds and the blues, when the device is rotated in the direction of the arrow. With reversal of direction, the reds become blue and the blues become red.

Figure 7:
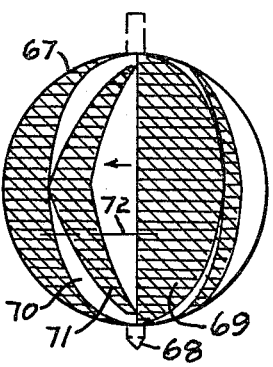
FIGURE 7 is a side view of a fourth embodiment in which an essentially combined strip-type and rotary-type pattern is applied to a surface having a generally compound curvature rotating as a top.

FIGURE 7 shows a fourth embodiment of the invention. In this case an essentially combined rotary-type and strip-type pattern is applied to at least a portion of a surface 67 having a generally compound curvature, such as that of a sphere, which rotates as in a spinning top having a vertical centrally-disposed spindle 68 upon which and about which the device rotates. Again, a plurality of complete cycle units on the pattern is indicated, a cycle unit comprising dark-shaded first segment 69, light-shaded second segment 70, and dark-shaded configurational element 71 contained within light-shaded second segment 70. The leading and trailing edges of configurational element 71 are again shown as being oblique to line of motion 72 at the respective intersections therewith. It is understood of course that the compound-curved surface does not necessarily have to be that of a sphere, that only a portion of such surface may be used if desired, and that such portion may be inverted and open at the upper side and the pattern applied to the inner surface thereof.

Figure 8:
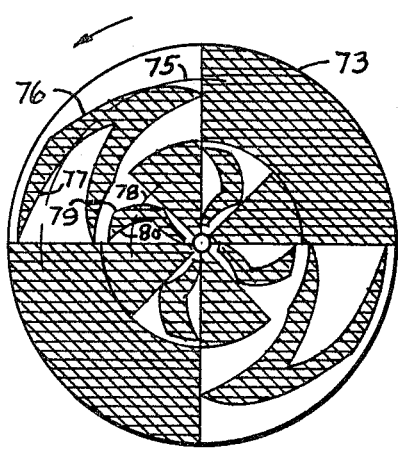
FIGURE 8 is a plan view of a preferred fifth embodiment of the invention in which a rotary-type pattern is applied to a flat surface rotating about a central axis normal thereto.
Figure 9:
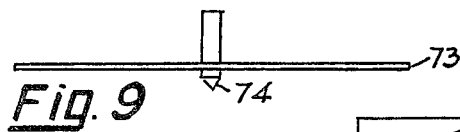
FIGURE 9 is a side elevation of one form of the embodiment of FIGURE 8.

FIGURE 8 shows a preferred fifth embodiment of the invention, this preferred embodiment utilizing a rotary-type pattern applied to a flat plate or disc 73 which rotates about a centrally-disposed axis, represented in the form shown in FIGURE 9 by supporting spindle 74, which axis is normal to the plane of the flat plate or disc 73.

The configuration of the pattern area shown in FIGURE 8 is intended to indicate one of the many variations and combinations which may be arranged to produce various color display configurations, all retaining however the basic non-demarcated spectrum character produceable by the present invention. In this illustration, the inner portion of the pattern area contains four cycle units, while the outer portion contains two cycle units, such that as the rotational speed of the pattern increases or decreases the color effects emanating from each of the inner and outer portions will vary individually and accordingly.

Again in accordance with the requirements of the invention, as in the case of all remaining FIGURES 10 through 17, in this FIGURE 8 illustration the leading and trailing edges 77 and 76 respectively of the configurational element are disposed obliquely to line of motion 75 at their respective intersections therewith, and leading edge 80 and trailing edge 79 of the configurational element are likewise disposed obliquely to line of motion 78 at their respective intersections therewith.

Variations or modified forms of the preferred fifth embodiment are illustrated in the remaining FIGURES 10 through 17.

Figure 10:
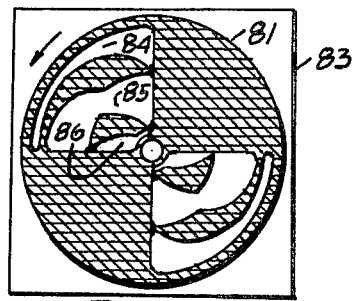
FIGURE 10 is a plan view of a flat centrally-spindled top of a single dark-shaded color, having one of the optically-functional elements removed therefrom and replaced functionally by a light-shaded surface above which the top rotates horizontally.
Figure 11:
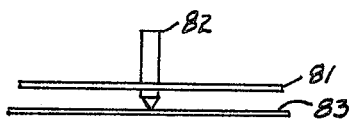
FIGURE 11 is a side elevation of FIGURE 10.

The showing of FIGURE 10 is a spinning top having a flat circular horizontally-rotating disc 81 which is supported and spun by centrally-located spindle 82 resting on and above a white surface 83. Disc 81, die-cut preferably from cardboard or metal or molded of plastic integrally with spindle 82, is of a single dark-shaded color. The areas 84, 85, and 86 are removed or omitted from disc 81, leaving apertures in these areas, in which areas the required second segment of the cycle unit would normally appear as a light-shaded color on the disc if not apertured. As the top is rotated, light being reflected and revealed to the viewer from light-shaded surface 83 upwardly through the apertures 84, 85, and 86 provides the optical function which would be normally provided by the second segment of the cycle unit if it were located on or in the same plane as the disc 81.

Figure 12:
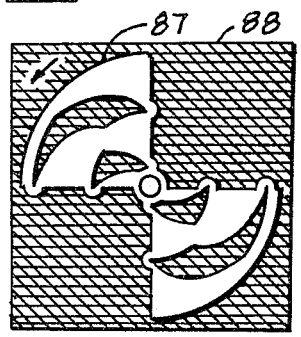
FIGURE 12 is a plan view of a flat centrally-spindled form of a single light-shaded color, having two of the optically-functional elements omitted therefrom and replaced functionally by a dark-shaded surface above which the top rotates horizontally.

Note that in FIGURES 10 and 12 a still different arrangement of configurational elements is illustrated. In each of these figures there are two separated configurational elements with the same second segment of the cycle unit. Each configurational element in such a case produces its own individual display of non-demarcated spectrum colors characteristic of the invention.

FIGURE 12 likewise shows a flat centrally-spindled horizontally-spinning top or form 87 which however as is shown need not be fully circular and which is based on the same principle as that of FIGURE 10 except that it is in reverse thereof. The form 87 is made of one piece being of only one light-shaded color. In this case the underlying surface 88 on and above which the top spins is of a dark-shaded color, and only the light-shaded second segment of the cycle unit is therefore in the plane of the rotating form 87. The dark-shaded first segment and the dark-shaded configurational element are omitted from the plane of the form 87, and their optical effect is provided by the dark-shaded surface 88 essentially the same as though they were located in the same plane of the form 87, as is the light-shaded second segment of the cycle unit.

Figure 13:
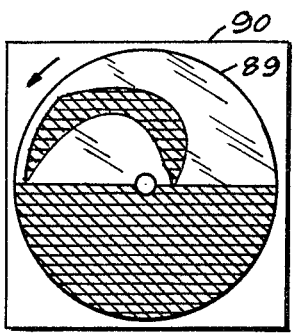
FIGURE 13 is a plan view of a flat, centrally-spindled, circular, transparent top having the necessary optically-functional dark-shaded elements applied thereon, and having thereunder a light-shaded surface above which the top rotates horizontally.
Figure 14:
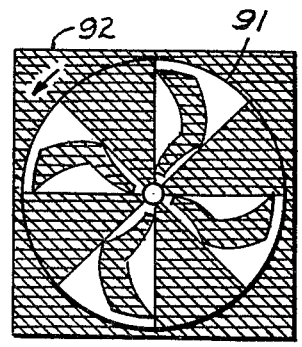
FIGURE 14 is a plan view of a flat, centrally-spindled, circular, transparent top having the necessary optically-function light-shaded elements applied thereon, and having thereunder a dark-shaded surface above which the top rotates horizontally.

FIGURES 13 and 14 show further variations which are comparable to those shown by FIGURES 10 and 12; but in these instances the rotating horizontal disc is made of a transparent material such as clear plastic, thus permitting the color of the underlying surface likewise to show through to the viewer in the proper areas as the top rotates. In FIGURE 13, transparent disc 89 has the dark-shaded first segment and the dark-shaded configurational element of the cycle unit painted, silk-screened, printed or otherwise applied to the disc; and the underlying surface 90, on and above which the top spins, is light-shaded. In FIGURE 14, transparent disc 91 has only the light-shaded second segment of the cycle unit applied thereon, and the underlying surface 92, on and above which the top spins, is dark-shaded.

Figure 15:
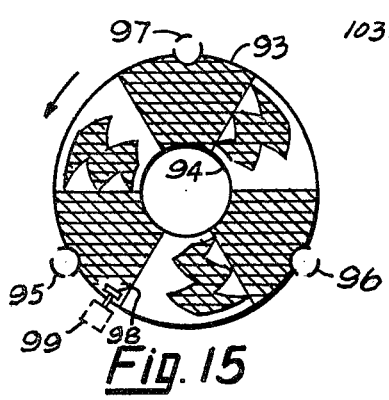
FIGURE 15 is a side view of a flat, circular, annularly-shaped disc supported and rotated from one of its perimeters in a vertical plane about a central horizontal axis normal thereto.

The modified form shown in FIGURE 15 is in the shape of a flat, circular, annular disc, having an inner periphery 94 and an outer periphery 93, and rotatable in preferably a vertical attitude about a central axis which is normal to the plane of the disc and preferably horizontal. The disc may be suitably supported by and driven from either of its perimeters, but in the illustration V-shaped pulleys or guides 95, 96, and 97 provide such support and guidance at the outer perimeter 93, while a motor 99, driving a rotating frictional driving wheel 98 which is opposed on the opposite side of the disc by an unshown idler wheel, drives the disc in the rotational direction desired. The purpose of the annular shape is to permit an open area within the rotating pattern in which stationary advertising data, figures, pictures, or the like may be displayed while the surrounding annular pattern rotates around them.

Note that in FIGURE 15 a still further arrangement of configurational element is shown. In this instance, in which three cycle units are shown, the configurational element is formed by several such elements all conjoined so as to form a single element. As shown, when rotated anti-clockwise the pattern will produce red and non-demarcated intermediate spectrum colors to green, but not to blue, since in this case no part of the configurational element immediately precedes the dark-shaded first segment; rotated clockwise, the colors will run from blue to green, but not to red.

Figure 16:
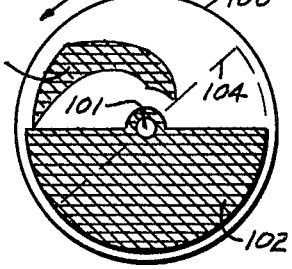
FIGURE 16 is a view of a flat rotary-type pattern having one of its dark-shaded elements angularly movable about the axis of rotation with respect to its dark-shaded configurational element so as to permit variations in resultant color effects.
Figure 17:
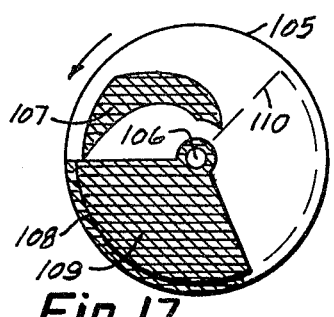
FIGURE 17 is a view of a flat rotary-type pattern having one of its dark-shaded elements comprised of two parts, at least one of which is angularly movable about the axis of rotation with respect to the other and to the dark-shaded configurational element, so as to permit further variations in resultant color effects.

FIGURES 16 and 17 show modified forms of the preferred fifth embodiment in which the dark-shaded first segment, in full or in part, is angularly movable about the axis of rotation, such that the relative percentage of dark-shaded first segment and of light-shaded second segment within a cycle unit, together with the angular relationships with the dark-shaded configurational element, may be varied or made variable at will, thus permitting variations in the resultant color effects and display.

In FIGURE 16, dark-shaded configurational element 103 is fixedly applied to pattern 100 (as is the light-shaded second segment), whereas dark-shaded first segment 102 is separate from pattern 100 and is angularly rotatable about the axis of rotation 101 of the pattern, and thus may be rotated from the position shown in the figure to a position such as that indicated by line 104 or to any other desired position.

In FIGURE 17, the dark-shaded configurational element 107 is applied fixedly to pattern 105 (as is the light-shaded second segment), and the dark-shaded first segment is variable, either in part or in full, in that either portion 108 thereof is fixedly applied to pattern 105 and portion 109 is separate from pattern 105 and may be angularly moved or rotated about the axis of rotation 106 of the pattern to a position such as that indicated by line 110 or to any other position, or both portions 108 and 109 are separate from pattern 105 and from each other and thus may be angularly moved about axis of rotation 106 to any desired position.

It will be readily realized and appreciated that many other variations in substance or in detail are possible without deviating from the principle, scope, or spirit of the invention as set forth hereinbefore and in the subjoined claims.

I claim:
1. A movable pattern comprising
 (A) an illuminable and viewable pattern area, said pattern area having incorporated therewithin
 (B) at least one cycle unit so disposed as to be optically repeatable more than about 3 times per second in consequence of continuous motion of said pattern, said cycle unit comprising
  (a) at least one essentially dark-shaded first segment extending transversely of the respective lines of motion of constituent points in said cycle unit, and extending longitudinally of said lines of motion in distance from about 30% to about 55% of the lineal dimensions of said cycle unit along the respective said lines of motion,
  (b) at least one essentially light-shaded second segment extending transversely of said lines of motion, and extending longitudinally of said lines of motion for the remainder of the lineal dimensions of said cycle unit along the respective said lines of motion, said light-shaded second segment having a leading edge and a trailing edge, and said light-shaded second segment having disposed therewithin,
  (c) at least one dark-shaded configurational element comprising a multiplicity of imaginary constituent lines essentially conjoined transversely of said lines of motion and extending longitudinally of said lines of motion a distance from about 15% to about 35% of the lineal dimensions of said cycle unit along the respective said lines of motion, said conjoined constituent lines terminating in conjoined ends thereof, said conjoined ends forming a leading edge and a trailing edge of said configurational element in a geometric disposition such that, in attitudes relative to said leading edge and said trailing edge of said light-shaded second segment,
   (1) component portions of at least one of the two said leading edges and component portions of at least one of the two said trailing edges are in essence disposed obliquely to, at their respective intersections with, the said lines of motion of the constituent points at such respective intersections.
2. A movable pattern as in claim 1 wherein
 (A) said dark-shaded first segment and said dark-shaded configurational element are essentially black, and wherein
 (B) said light-shaded second segment is essentially white.
3. A movable pattern as in claim 1 wherein
 (A) said pattern is cylindrical and rotationally movable, as on the wall of a rotating drum, about a cen- trally disposed axis of rotation thereof, and wherein,
as a consequence thereof,
(B) said lines of motion are circular and concentric about said axis of rotation.

4. A movable pattern as in claim 1 wherein
(A) said pattern is an endless strip adapted to be translationally moved, as on an endless belt, between oppositely disposed rotating drums, and wherein, as a consequence thereof,
(B) said lines of motion, between said rotating drums, are straight and parallel lines.

5. A movable pattern as in claim 1 wherein
(A) said cycle unit is disposed essentially on at least a portion of a generally conical shaped surface, and wherein
(B) said pattern is rotationally movable about an axis of rotation disposed centrally thereof, and wherein, as a consequence thereof,
(C) said lines of motion are circular and concentric about said axis of rotation.

6. A movable pattern as in claim 1 wherein
(A) said cycle unit is disposed essentially on at least a portion of a surface having a generally compound curvature, and wherein,
(B) said pattern is rotationally movable about an axis of rotation disposed centrally thereof, and wherein, as a consequence thereof,
(C) said lines of motion are circular and concentric about said axis of rotation.

7. An essentially flat pattern rotatable about an axis of rotation disposed centrally thereof and normal thereto, comprising
(A) a pattern area illuminable and viewable from at least one side thereof, said pattern area having incorporated therewithin,
(B) at least one cycle unit so disposed as to be optically repeatable more than about 3 times per second in consequence of continuous rotary motion of said pattern, said cycle unit comprising
  (a) at least one essentially dark-shaded first segment extending transversely of the respective circular lines of motion of constituent points in said cycle unit, and extending longitudinally of said circular lines of motion in distance from about 30% to about 55% of the lineal dimensions of said cycle unit along the respective said circular lines of motion,
  (b) at least one essentially light-shaded second segment extending transversely of said circular lines of motion, and extending longitudinally of said circular lines of motion for the remainder of the lineal dimensions of said cycle unit along the respective said circular lines of motion, said light-shaded second segment having a leading edge and a trailing edge, and said light-shaded second segment having disposed therewithin,
  (c) at least one dark-shaded configurational element comprising a multiplicity of constituent lines essentially conjoined transversely of said circular lines of motion and extending longitudinally of said lines of motion a distance from about 15% to about 35% of the lineal dimensions of said cycle unit along the respective said circular lines of motion, said conjoined constituent lines terminating in conjoined ends thereof, said conjoined ends forming a leading edge and a trailing edge of said configurational element in a geometric disposition such that, in attitudes relative to said leading edge and said trailing edge of said light-shaded second segment,
    (1) component portions of at least one of the two said leading edges and component portions of at least one of the two said trailing edges are in essence disposed obliquely to, at their respective intersections with, the said lines of circular motion of the constituent points at such respective intersections.

8. The pattern of claim 7 wherein
(A) said pattern is a flat one-piece, essentially circular, light-shaded disc adapted for use in a horizontally spinning top having a supporting spindle centrally disposed therein and concentric with the axis of rotation of said pattern, and wherein
(B) said dark-shaded first segment and said dark-shaded configurational element are applied in a dark-shaded color on the viewable surface of said circular light-shaded disc in the said pattern area thereof.

9. The pattern of claim 7 wherein
(A) said pattern is a flat, one-piece, essentially circular, dark-shaded disc adapted for use in a horizontally spinning top having a supporting spindle centrally disposed therein and concentric with the axis of rotation of said pattern, and wherein
(B) said light-shaded second segment is applied essentially in a light-shaded color on the viewable surface of said dark-shaded circular disc, except in the area occupied by said dark-shaded configurational element, in the said pattern area thereof.

10. The pattern of claim 7 wherein
(A) said pattern is essentially a flat, one-piece, essentially circular, dark-shaded disc adapted for use in a horizontally spinning top having a supporting spindle centrally disposed therein and concentric with the axis of rotation of said pattern, and wherein
(B) the area occupied by said second segment is removed from said dark-shaded circular disc so as to permit a light-shaded surface disposed beneath said cycle unit to be revealed to view for providing the optical function of said light-shaded second segment.

11. The pattern of claim 7 wherein
(A) said pattern is an essentially flat, one-piece, light-shaded form adapted for use in a horizontally spinning top having a supporting spindle centrally disposed thereof and concentric with the axis of rotation of said pattern, and wherein
(B) the areas occupied by said first segment and said configurational element are omitted from said cycle unit so as to permit a dark-shaded surface disposed beneath said cycle unit to be revealed to view for providing the optical functions of said dark-shaded first segment and said dark-shaded configurational element.

12. The pattern of claim 7 wherein
(A) said pattern is essentially a flat transparent circular disc adapted for use in a horizontally spinning top having a supporting spindle centrally disposed therein and concentric with the axis of rotation of said pattern, and wherein
(B) said dark-shaded first segment and said dark-shaded configurational element are applied essentially in a dark-shaded color on at least one surface of said transparent circular disc, permitting a light-shaded surface disposed beneath said cycle unit to be revealed to view for providing the optical function of said light-shaded second segment.

13. The pattern of claim 7 wherein
(A) said pattern is essentially a flat transparent circular disc adapted for use in a horizontally spinning top having a supporting spindle centrally disposed therein and concentric with the axis of rotation of said pattern, and wherein
(B) said light-shaded second segment is applied in a light-shaded color, except in the area occupied by said dark-shaded configurational element, on at least one surface of said transparent circular disc, permitting a dark-shaded surface disposed beneath said cycle unit to be revealed to view for providing the optical functions of said dark-shaded first segment and said dark-shaded configurational element.

14. The pattern of claim 7 wherein
(A) said pattern is an essentially flat annularly-shaped disc adapted for being essentially supported at and rotated from a perimeter thereof.

15. The pattern of claim 7 wherein, in order to permit variation in color effects, said dark-shaded first segment of said cycle unit is angularly movable in relation to, and in a plane parallel to, said light-shaded second segment and said dark-shaded configurational element.

16. The pattern of claim 7 wherein, in order to permit variations in color effects, said dark-shaded first segment of said cycle unit is comprised of at least two separate and parallel components, at least one of which is angularly movable in relation to, and in a plane parallel to, the other and to said dark-shaded configurational element.

References Cited by the Examiner
UNITED STATES PATENTS

| | | | |
|---|---|---|---|
| 748,661 | 1/1904 | Scott | 46—49 |
| 984,044 | 2/1911 | Spencer | 46—49 |
| 1,869,276 | 7/1932 | Precourt | 46—47 X |

OTHER REFERENCES

Physiological Optics: Published by Professional Press, 1927; QP 475 265 (pp. 176–178).

ANTON O. OECHSLE, *Primary Examiner.*

R. F. CUTTING, *Assistant Examiner.*